United States Patent [19]

Goertz

[11] 4,180,151

[45] Dec. 25, 1979

[54] FLOW DIVERTING GATE FOR CONVEYORS

[75] Inventor: LeRoy E. Goertz, Upland, Calif.

[73] Assignee: Sunkist Growers, Inc., Sherman Oaks, Calif.

[21] Appl. No.: 927,582

[22] Filed: Jul. 24, 1978

[51] Int. Cl.² ............................................. B65G 47/76
[52] U.S. Cl. ..................................... 198/367; 198/637
[58] Field of Search ............... 198/367, 442, 456, 457, 198/491, 530, 370, 372, 599, 637; 193/31 R, 31 A, 36

[56] References Cited

U.S. PATENT DOCUMENTS

| | | | |
|---|---|---|---|
| 1,899,320 | 2/1933 | Dupuy | 198/599 X |
| 2,247,672 | 7/1941 | Thum | 198/442 |
| 3,709,353 | 1/1973 | Sheetz | 198/367 |
| 3,913,730 | 10/1975 | Gruodis et al. | 198/530 |

*Primary Examiner*—James L. Rowland
*Attorney, Agent, or Firm*—Paul A. Weilein

[57] ABSTRACT

A flow control or flow diverging gate assembly for a conveyor having a sidewall interrupted by an opening along its length, a flow diverting gate or shear being pivotably mounted in the opening and extendable and retractable in length, the unpivoted end of the gate being guided by track means including a first guide portion parallel with the sidewall and second guide portion traversing the conveyor, movement of the gate along the first guide portion providing a variable opening in the side wall to relieve overflow on the belt, movement of the gate along the second guide portion intercepting a portion of the flow path along the conveyor to selectively reduce the flow of articles therealong.

8 Claims, 3 Drawing Figures

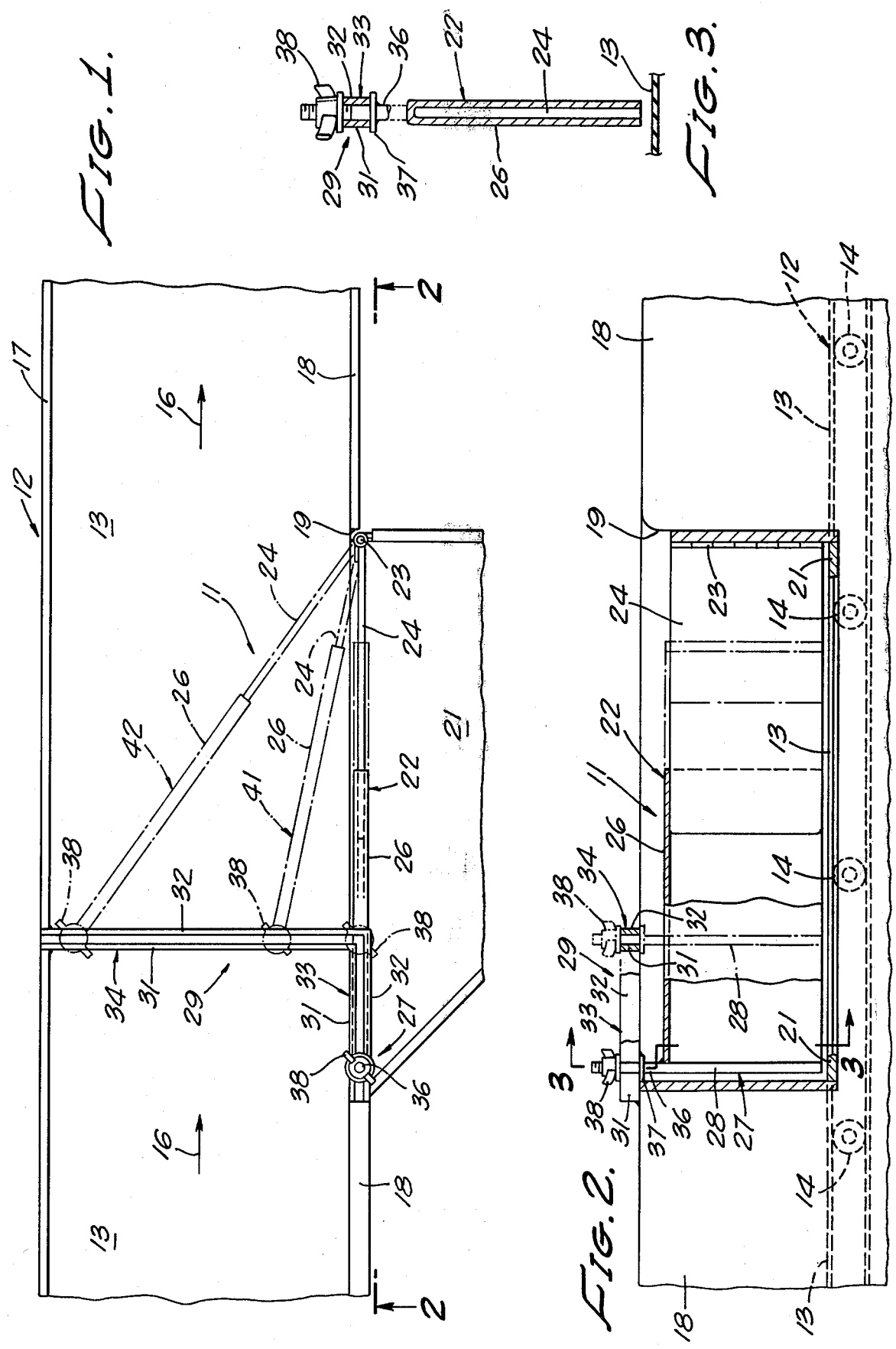

FLOW DIVERTING GATE FOR CONVEYORS

BACKGROUND OF THE INVENTION

The present invention relates to a flow control system for conveyors and more particularly to a flow diverting gate or shear in combination with an endless conveyor of the type suitable for carrying large numbers of objects such as fruit and the like.

Flow diverter gates are commonly employed in connection with endless conveyors. The conveyor may typically include an endless belt trained between sidewalls forming a trough along its length. Such conveyor is commonly employed in fruit handling operations or packing stations to provide a continuous supply of the fruit to processing machinery or personnel. In such applications, it may be desirable to provide excess flow of articles along the conveyor relative to requirements of a processing station. Thus, a portion of the flow may be diverted from the conveyor upstream from the processing station in order to closely adapt the amount or volume of flow on the conveyor to the requirements of the processing machine or personnel. Such diversion means may, of course, readily reduce flow upon the conveyor, but cannot increase flow upon the conveyor if the initial flow developed on the conveyor is not sufficient to meet the needs of the processing machine or personnel.

Accordingly, diverting means of the type contemplated by the present invention are employed to selectively decrease flow volume upon the conveyor. As noted above, flow volume on the conveyor may be regulated in order to adapt flow on the conveyor to requirements of the processing station. At the same time, it is also important to note that objects such as fruit and the like are subject to damage especially when an excess volume of the fruit is traveling along the conveyor. For example, if articles of fruit are stacked upon each other while traveling along the conveyor, they will tend to be pushed against the conveyor sidewalls which may cause bruising or abrasion of the fruit. Damage to the fruit may also occur, for example, when a diverter gate or shear is forced into the flow path of the fruit.

Numerous designs and types of flow diverter gates have been contemplated in the prior art for solving one or more of these problems. However, it has been found that a need remains for a flow control or variable flow diverting means of relatively simple and effective design capable of reliably regulating flow volume along a conveyor while eliminating or minimizing problems of the type referred to above.

SUMMARY OF THE INVENTION

It is therefore an object of the invention to provide a flow control assembly including a single gate or shear element which may be closely regulated to form a lateral opening along the conveyor for relieving overflow conditions thereon while also being selectively movable across the width of the conveyor in order to reduce flow volume thereon.

It is a further object of the invention to provide such a flow control assembly for a longitudinal conveyor having at least one sidewall with an opening therealong, an extendable and retractable gate or shear being pivotably adjacent the sidewall, guide means being coupled with the unpivoted end of the gate for causing retraction of the gate to form an opening in the sidewall and also for pivoting the gate across the flow path of the conveyor to selectively decrease flow volume carried by the conveyor.

It is an even further object of the invention to provide such a flow control assembly wherein the guide means comprises a track including a first guide portion generally parallel with the sidewall of the conveyor and a second guide portion generally traversing the conveyor.

Additional objects and advantages of the invention are made apparent in the following description having reference to the accompanying drawing.

BRIEF DESCRIPTION OF THE DRAWING

FIG. 1 is a plan view of a flow control assembly constructed in accordance with the present invention and illustrated in combination with a linear conveyor.

FIG. 2 is a side view in elevation of the conveyor and flow control assembly, with parts in section, taken along section line 2—2 of FIG. 1; and FIG. 3 is an enlarged, fragmentary view, with parts in section, taken along section line 3—3 of FIG. 2 in order to better illustrate a particular portion of the flow control assembly.

DESCRIPTION OF THE PREFERRED EMBODIMENT

The present invention contemplates a flow control assembly generally indicated at 11 in FIGS. 1 and 2 for use in connection with a linear conveyor of the type generally indicated at 12. As may be best seen in FIG. 2, the conveyor is of a type including an endless belt 13 trained about guide rollers 14 to provide a moving surface, the belt being movable in the direction of the arrows 16 shown in FIG. 1. The conveyor also includes a pair of spaced apart sidewalls 17 and 18 disposed upon opposite sides of the endless conveyor belt in order to form a trough-like depression in connection with the belt for carrying objects along the conveyor. As will be more apparent from the following detailed description of the flow control assembly 11, it may also be used in conjunction with other longitudinal conveyors of a type suitable for carrying relatively large numbers of objects such as fruit or the like along its length.

For cooperation with the flow control assembly 11, the conveyor 12 has an elongated opening 19 formed in its sidewall 18. A diversion channel or conveyor 21 is also formed along the length of the opening 19 in order to receive objects diverted from the conveyor by the flow control assembly 11.

The flow control assembly 11 includes a gate or shear 22, one end of the gate being pivotably supported at 23 adjacent one end of the opening 19 in the sidewall 18. The gate 22 is preferably of extendable and retractable length in order to adapt it for operation in accordance with the present invention. The gate 22 is preferably formed from a plurality of telescoping sections 24 and 26. With the gate 22 in an extended condition, its unpivoted end 27 extends across the opening 19 in order to make the sidewall 18 generally continuous. The pivotable and extendable construction of the gate 22 particularly adapts it to be repositioned in a simple and effective manner for accomplishing a variety of functions within the flow control assembly.

A guide post 28 extends upwardly from the unpivoted end of the gate. A track unit 29 is formed by spaced apart straps 31 and 32 forming an elongated opening therebetween for receiving the guide post 28. The track unit 29 includes a first guide portion 33 arranged in parallel with the sidewall 18 and a second guide portion 34 extending transversely across the axis of the conveyor belt 13.

The upper end 36 of the guide post is formed with a flange 37 disposed beneath the track unit, the upper end of the post being threaded in order to receive tightening means such as the wing nut indicated at 38.

Movement of the post 28 along the first guide portion 33 of the track causes the gate 22 to form a lateral opening within the sidewall 18 while not interfering with flow along the conveyor belt 13. When the post 28 is moved along the second guide portion 34 of the track, the gate is selectively pivoted across the conveyor belt in order to decrease or completely interrupt flow of articles along the conveyor, objects diverted from the conveyor belt 13 being directed into the side channel or conveyor 21 by the flow control assembly.

In operation, start-up of the conveyor may be accomplished, for example, with the gate 22 being in the solid line position illustrated in FIG. 1 in order to completely close the opening 19 and make the sidewall 18 continuous. Once fruit or other objects are introduced into the flow path of the conveyor, the unpivoted end of the gate may be moved along the first guide portion 33 of the track in order to form a variable opening along the sidewall 18. If fruit or other articles are stacked one upon another within the conveyor, they will tend to develop lateral pressure causing a portion of the objects to naturally flow through the opening formed in the sidewall 18.

If it is desired to divert even more of the objects from the conveyor, the leading or unpivoted end of the gate may be moved across the second guide portion 34 of the track as indicated by the phantom representations 41 and 42 of the extendable and retractable gate. With the gate in the first phantom position 41, it traverses or intercepts a selected lateral portion of the conveyor belt 13 in order to selectively diminish flow volume along the conveyor. The phantom position 42 of the extendable and retractable gate indicates its maximum movement in order to completely traverse and block all flow along the conveyor belt 13. All flow along the conveyor is then diverted toward the side channel or conveyor 21.

It may be further seen that, as the leading end of the gate 22 completes travel along the first guide portion 33 of the track and begins to move along the second guide portion 34, it moves into the path of fruit or other objects flowing along the conveyor. Because of the two-part construction of the track, a lateral opening is first formed in the sidewall 18 during travel of the gate along the first guide portion 33. This tends to relieve excess pressure due to overloading of the conveyor and thus permits the unpivoted end of the gate to be moved across the conveyor with less tendency to damage the fruit or other objects carried by the conveyor.

The wing nut 38 may be tightened in order to secure the gate in any position with its leading edge along the length of either the first or second guide portion of the track. Thus, the combination of the extendable and retractable gate together with the two part guide track provides a particularly simple and effective means for both forming a side opening in the conveyor while also positively diverting a portion of the flow along the conveyor into the side channel or conveyor 21.

Various modifications are believed obvious within the preferred embodiment of the invention as described above. For example, the track unit 29 could be formed to have an arcuate configuration, an initial portion of the arcuate track lying generally parallel to the sidewall 18 with a subsequent arcuate portion of the track tending to traverse the conveyor belt much like the second guide portion 34 of the illustrated track 29. Other features of the flow control assembly 11 and conveyor 12 could also be modified without departing from the scope of the present invention which is defined by the following appended claims.

I claim:

1. A flow control assembly in combination with a longitudinal conveyor including longitudinal conveyor means and a sidewall disposed along one side thereof, the sidewall forming an opening along its length, the flow control assembly comprising an extendable and retractable gate having one end pivotably mounted adjacent one end of the opening in the sidewall and a guide unit operatively coupled with an unpivoted end of said gate, said guide unit including first guide means for extending said gate to a position to close the sidewall opening and for retracting said gate to form an opening therein, said guide unit including a second guide portion for moving the unpivoted end of said gate across the conveyor means in order to selectively reduce the effective flow capacity of the conveyor.

2. The flow control assembly of claim 1 further comprising locking means for fixing said gate in any position established by either of said first and second guide means.

3. The flow control assembly of claim 1 further comprising a side channel in communication with the opening in the conveyor sidewall for receiving flow diverted from the conveyor by the flow control assembly.

4. The flow control assembly of claim 1 wherein said guide unit comprises track means for receiving a projecting guide portion of said gate at its unpivoted end, said first guide portion comprising a portion of said track disposed generally parallel with the conveyor sidewall, said second guide portion comprising a portion of the track extending generally transverse to the flow axis of the conveyor.

5. The flow control assembly of claim 4 further comprising locking means including clamp means arranged for interaction between said unpivoted end of said gate and said track means in order to selectively fix the position of said gate means.

6. The flow control assembly of claim 1 wherein said conveyor is of a type including an endless belt and a pair of spaced apart sidewalls, said extendable and retractable gate being pivotably supported within an opening formed by one of the sidewalls.

7. A flow control assembly for an endless belt conveyor including an endless belt trained over guide rolls with sidewalls disposed on opposite sides thereof, one of the sidewalls forming an opening along its length, the flow control assembly comprising an extendable and retractable gate having one end pivotably supported adjacent one end of the opening in the sidewall, an unpivoted end of said extendable and retractable gate extending generally into the direction of travel for the conveyor, guide means being adapted to position said unpivoted end of said gate and including a first track portion extending parallel to the sidewall for receiving a projecting portion on said unpivoted end of said gate, said guide means including a second track portion forming a continuation of said first track portion and extending perpendicularly across the path of the conveyor belt, the projecting portion of said gate being movable along said first track portion to form an opening in the sidewall and along said second track portion in order to positively divert flow from a lateral portion of the conveyor belt.

8. The flow control assembly of claim 7 further comprising locking means for fixing said gate in any position established by either of said first and second track portions.